United States Patent
Siegel et al.

(10) Patent No.: US 8,286,256 B2
(45) Date of Patent: Oct. 9, 2012

(54) METHOD AND SYSTEM FOR RESTRICTED BIOMETRIC ACCESS TO CONTENT OF PACKAGED MEDIA

(75) Inventors: Brian Siegel, Washingtonville, NY (US); Philip Michael Abram, Warwick, NY (US); Marc Beckwitt, San Clemente, CA (US); Gregory D. Gudorf, San Diego, CA (US); Kazuaki Iso, Oradell, NJ (US); Brian Raymond, San Diego, CA (US); Christopher M. Tobin, Central Valley, NY (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 12/288,063

(22) Filed: Oct. 16, 2008

(65) Prior Publication Data

US 2009/0113529 A1    Apr. 30, 2009

Related U.S. Application Data

(63) Continuation of application No. 09/797,516, filed on Mar. 1, 2001, now abandoned.

(51) Int. Cl.
*H04L 9/32* (2006.01)
(52) U.S. Cl. .............. 726/28; 726/5; 726/7; 726/29; 713/189
(58) Field of Classification Search .............. 726/28, 726/5, 7, 29; 713/189
See application file for complete search history.

(56) References Cited

U.S. PATENT DOCUMENTS

| | | | |
|---|---|---|---|
| 4,582,985 A | 4/1986 | Lofberg | |
| 4,766,293 A | 8/1988 | Boston | |
| 4,805,222 A | 2/1989 | Young et al. | |
| 4,816,653 A | 3/1989 | Anderl et al. | |
| 5,056,019 A | 10/1991 | Schultz et al. | |
| 5,131,038 A | 7/1992 | Puhl et al. | |
| 5,173,851 A | 12/1992 | Off et al. | |
| 5,221,838 A | 6/1993 | Gutman et al. | |

(Continued)

FOREIGN PATENT DOCUMENTS

EP    0917119 A2    5/1999

(Continued)

OTHER PUBLICATIONS

Crawford, Sharon. "Windows 2000 Pro: The Missing Manual" © 2000 O'Reilly Media Inc. Excerpts from chapters 9 & 13 (32 pages total).*

(Continued)

*Primary Examiner* — Edward Zee
*Assistant Examiner* — Thomas Gyorfi
(74) *Attorney, Agent, or Firm* — Lerner, David, Littenberg, Krumholz & Mentlik, LLP

(57) ABSTRACT

A system, method, and user device for restricting access to the content of media over a network. Biometric information is collected and compared against pre-stored biometric information of a user to authenticate the identity of the user. The user then requests access to the content of a medium. Access is permitted to the requested content if the content is identified as content, or indicia identifying the content, that the user previously uploaded to the server. Access is denied to the requested content if the content is not identified as content, or indicia identifying the content, that the user previously uploaded to the server.

17 Claims, 4 Drawing Sheets

U.S. PATENT DOCUMENTS

| | | | |
|---|---|---|---|
| 5,256,863 A | 10/1993 | Ferguson et al. | |
| 5,276,736 A | 1/1994 | Chaum | |
| 5,280,527 A | 1/1994 | Gullman et al. | |
| 5,323,146 A | 6/1994 | Glaschick et al. | |
| 5,329,589 A | 7/1994 | Fraser et al. | |
| 5,436,972 A | 7/1995 | Fischer | |
| 5,457,747 A | 10/1995 | Drexler et al. | |
| 5,461,217 A | 10/1995 | Claus | |
| 5,475,758 A | 12/1995 | Kikuchi et al. | |
| 5,521,362 A | 5/1996 | Powers | |
| 5,521,890 A | 5/1996 | Miche et al. | |
| 5,537,314 A | 7/1996 | Kanter | |
| 5,545,139 A | 8/1996 | Kriesel | |
| 5,550,358 A | 8/1996 | Tait et al. | |
| 5,557,518 A | 9/1996 | Rosen | |
| 5,557,541 A | 9/1996 | Schulhof et al. | |
| 5,561,709 A | 10/1996 | Remillard | |
| 5,594,230 A | 1/1997 | Waite et al. | |
| 5,598,474 A | 1/1997 | Johnson | |
| 5,604,805 A | 2/1997 | Brands | |
| 5,615,277 A | 3/1997 | Hoffman | |
| 5,623,552 A | 4/1997 | Lane | |
| 5,650,761 A | 7/1997 | Gomm et al. | |
| 5,661,807 A | 8/1997 | Guski et al. | |
| 5,696,827 A | 12/1997 | Brands | |
| 5,710,887 A | 1/1998 | Chelliah et al. | |
| 5,712,913 A | 1/1998 | Chaum | |
| 5,734,838 A | 3/1998 | Robinson et al. | |
| 5,737,701 A | 4/1998 | Rosenthal et al. | |
| 5,744,787 A | 4/1998 | Teicher | |
| 5,748,737 A | 5/1998 | Daggar | |
| 5,761,308 A | 6/1998 | Torii et al. | |
| 5,778,068 A | 7/1998 | Johnson et al. | |
| 5,778,384 A | 7/1998 | Provino et al. | |
| 5,796,832 A | 8/1998 | Kawan | |
| 5,809,212 A | 9/1998 | Shasha | |
| 5,815,665 A | 9/1998 | Teper et al. | |
| 5,825,876 A | 10/1998 | Peterson, Jr. | |
| 5,838,812 A | 11/1998 | Pare, Jr. et al. | |
| 5,841,871 A | 11/1998 | Pinkas et al. | |
| 5,856,659 A | 1/1999 | Drupsteen et al. | |
| 5,870,723 A | 2/1999 | Pare, Jr. et al. | |
| 5,878,138 A | 3/1999 | Yacobi | |
| 5,878,139 A | 3/1999 | Rosen | |
| 5,878,235 A | 3/1999 | Porterfield et al. | |
| 5,884,271 A | 3/1999 | Pitroda | |
| 5,884,272 A | 3/1999 | Walker et al. | |
| 5,887,140 A | 3/1999 | Itsumi et al. | |
| 5,892,900 A | 4/1999 | Ginter et al. | |
| 5,897,622 A | 4/1999 | Blinn et al. | |
| 5,903,721 A | 5/1999 | Sixtus | |
| 5,915,022 A | 6/1999 | Robinson et al. | |
| 5,917,913 A | 6/1999 | Wang | |
| 5,923,016 A | 7/1999 | Fredregill et al. | |
| 5,926,624 A | 7/1999 | Katz et al. | |
| 5,926,798 A | 7/1999 | Carter et al. | |
| 5,936,220 A | 8/1999 | Hoshino et al. | |
| 5,943,423 A | 8/1999 | Muftic | |
| 5,945,652 A | 8/1999 | Ohki et al. | |
| 5,948,040 A | 9/1999 | DeLorme et al. | |
| 5,949,411 A | 9/1999 | Doerr et al. | |
| 5,956,699 A | 9/1999 | Wong et al. | |
| 5,960,411 A | 9/1999 | Hartman et al. | |
| 5,966,704 A | 10/1999 | Furegati et al. | |
| 5,987,134 A | 11/1999 | Shin et al. | |
| 5,990,804 A | 11/1999 | Koyama | |
| 6,000,832 A | 12/1999 | Franklin et al. | |
| 6,002,770 A | 12/1999 | Tomko et al. | |
| 6,002,787 A | 12/1999 | Takhar et al. | |
| 6,003,014 A | 12/1999 | Lee et al. | |
| 6,006,200 A | 12/1999 | Boies et al. | |
| 6,009,415 A | 12/1999 | Shurling et al. | |
| 6,012,039 A | 1/2000 | Hoffman et al. | |
| 6,014,636 A | 1/2000 | Reeder | |
| 6,016,476 A | 1/2000 | Maes et al. | |
| 6,018,724 A | 1/2000 | Arent | |
| 6,021,496 A | 2/2000 | Dutcher et al. | |
| 6,023,679 A | 2/2000 | Acebo et al. | |
| 6,026,491 A | 2/2000 | Hiles | |
| 6,029,150 A | 2/2000 | Kravitz | |
| 6,035,403 A | 3/2000 | Subbiah et al. | |
| 6,047,268 A | 4/2000 | Bartoli et al. | |
| 6,047,269 A | 4/2000 | Biffar | |
| 6,073,124 A | 6/2000 | Krishnan et al. | |
| 6,076,075 A | 6/2000 | Teicher et al. | |
| 6,076,167 A | 6/2000 | Borza et al. | |
| 6,078,891 A | 6/2000 | Riordan et al. | |
| 6,085,178 A | 7/2000 | Bigus et al. | |
| 6,088,731 A | 7/2000 | Kiraly et al. | |
| 6,105,010 A | 8/2000 | Musgrave | |
| 6,108,644 A | 8/2000 | Goldschlag et al. | |
| 6,119,096 A | 9/2000 | Mann et al. | |
| 6,122,737 A | 9/2000 | Bjorn et al. | |
| 6,128,602 A | 10/2000 | Northington et al. | |
| 6,129,274 A | 10/2000 | Suzuki | |
| 6,138,911 A | 10/2000 | Fredregill et al. | |
| 6,141,754 A | 10/2000 | Choy | |
| 6,148,241 A | 11/2000 | Ludtke et al. | |
| 6,151,600 A | 11/2000 | Dedrick | |
| 6,163,772 A | 12/2000 | Kramer et al. | |
| 6,167,517 A | 12/2000 | Gilchrist et al. | |
| 3,741,214 A | 1/2001 | Smith | |
| 6,226,618 B1 | 5/2001 | Downs et al. | |
| 6,263,446 B1 | 7/2001 | Kausik et al. | |
| 6,269,348 B1 | 7/2001 | Pare, Jr. et al. | |
| 6,270,011 B1 | 8/2001 | Gottfried | |
| 6,279,112 B1 | 8/2001 | O'Toole, Jr. et al. | |
| 6,282,653 B1 | 8/2001 | Berstis et al. | |
| 6,289,323 B1 | 9/2001 | Gordon et al. | |
| 6,310,966 B1 | 10/2001 | Dulude et al. | |
| 6,314,196 B1 | 11/2001 | Yamaguchi et al. | |
| 6,353,811 B1 | 3/2002 | Weissman | |
| 6,356,905 B1 | 3/2002 | Gershman et al. | |
| 6,366,953 B2 | 4/2002 | Inoue | |
| 6,370,629 B1 | 4/2002 | Hastings et al. | |
| 6,423,892 B1 * | 7/2002 | Ramaswamy | 84/609 |
| 6,434,535 B1 | 8/2002 | Kupka et al. | |
| 6,442,692 B1 | 8/2002 | Zilberman | |
| 6,453,301 B1 | 9/2002 | Niwa | |
| 6,487,662 B1 | 11/2002 | Kharon et al. | |
| 6,507,727 B1 * | 1/2003 | Henrick | 455/3.06 |
| 6,529,885 B1 | 3/2003 | Johnson | |
| 6,556,976 B1 | 4/2003 | Callen | |
| 6,560,741 B1 | 5/2003 | Gerety et al. | |
| 6,574,607 B1 | 6/2003 | Carter et al. | |
| 6,578,014 B1 | 6/2003 | Murcko, Jr. | |
| 6,592,044 B1 | 7/2003 | Wong et al. | |
| 6,615,264 B1 | 9/2003 | Stoltz et al. | |
| 6,655,585 B2 | 12/2003 | Shinn | |
| 6,662,166 B2 | 12/2003 | Pare, Jr. et al. | |
| 6,687,390 B2 | 2/2004 | Avni et al. | |
| 6,910,132 B1 * | 6/2005 | Bhattacharya | 713/186 |
| 6,941,462 B1 * | 9/2005 | Tsukamura et al. | 713/186 |
| 6,968,453 B2 * | 11/2005 | Doyle et al. | 713/168 |
| 7,003,495 B1 * | 2/2006 | Burger et al. | 705/50 |
| 7,124,300 B1 * | 10/2006 | Lemke | 713/186 |
| 7,181,297 B1 * | 2/2007 | Pluvinage et al. | 700/94 |
| 7,251,633 B2 * | 7/2007 | Ludtke et al. | 705/64 |
| 7,284,266 B1 * | 10/2007 | Morris et al. | 726/9 |
| 7,565,541 B1 * | 7/2009 | Tarbouriech | 713/176 |
| 7,613,659 B1 * | 11/2009 | Hoffman et al. | 705/44 |
| 2001/0044906 A1 | 11/2001 | Kanevsky et al. | |
| 2001/0045458 A1 | 11/2001 | Polansky | |
| 2001/0051996 A1 * | 12/2001 | Cooper et al. | 709/217 |
| 2002/0123967 A1 | 9/2002 | Wang | |
| 2002/0123971 A1 * | 9/2002 | Maritzen et al. | 705/64 |
| 2002/0128980 A1 * | 9/2002 | Ludtke et al. | 705/67 |
| 2002/0147914 A1 | 10/2002 | Arnold | |
| 2004/0044627 A1 | 3/2004 | Russell et al. | |

FOREIGN PATENT DOCUMENTS

| | | |
|---|---|---|
| EP | 1 033 687 A2 | 9/2000 |
| EP | 1 085 424 A1 | 3/2001 |
| JP | 9722857 | 2/1997 |
| JP | 9978521 | 3/1999 |
| JP | 99164179 | 6/1999 |
| TW | 351799 | 2/1999 |

| | | |
|---|---|---|
| TW | 87107650 | 2/1999 |
| WO | WO-95/13591 | 5/1995 |
| WO | WO-99/06928 | 2/1999 |
| WO | WO-01/08055 A1 | 2/2001 |
| WO | WO-01/22351 A1 | 3/2001 |
| WO | WO-01/50428 A1 | 7/2001 |
| WO | WO-01/59732 A2 | 8/2001 |
| WO | WO-2005/033830 | 4/2005 |

OTHER PUBLICATIONS

Delio, Michelle. "PC Expo: It's All About the Hand". Published Jun. 27, 2000 by wired.com (2 pages) http://www.wired.com/print/science/discoveries/news/2000/06/37266.*

Sommefeldt, Ryszard. "Compaq iPAQ H3630 PocketPC Review". Published Jan. 23, 2001 by hexus.net (7 pages) http://www.hexus.net/content/item_print.php?item=130.*

"Ethenticator MS 3000" product page from ethentica.com Observed by the Internet Archive on Aug. 15, 2000 (2 pages) http://web.archive.org/web/20000815235523/www.ethentica.com/ms3000.pdf.*

"Expansion Packs" product page from compaq.com Observed by the Internet Archive on Aug. 15, 2000 (2 pages) http://web.archive.org/web/20000815202017/www.compaq.com/products/handhelds/pocketpc/jackets.html.*

Page 1 of the Hexus.net Compaq IPAQ review, as observed on Jun. 22, 2001 by the Internet Archive (4 pages) http://web.archive.org/web/20010622214152/http://www.hexus.net/review.php?review=130.*

Page 2 of the Hexus.net Compaq IPAQ review, as observed on Jul. 18, 2001 by the Internet Archive (3 pages) http://web.archive.org/web/20010718181423/www.hexus.net/ipaqp2.php.*

Page 3 of the Hexus.net Compaq IPAQ review as observed on Jul. 22, 2001 by the Internet Archive (4 pages) http://web.archive.org/web/20010722143846/www.hexus.net/ipaqp3.php.*

"Compaq iPAQ H3000 Pocket PC Reference Guide" © 2000 Compaq Computer Corporation (118 pages) http://www.ipaqrepair.co.uk/guides/H3000-Series-Manual.pdf.*

"Teletype GPS: Compaq Expansion Pack Options" (4 pages) http://web.archive.org/web/20021003121038/www.teletype.com/p...*

"Windows® CE 3.0 Based Embedded System Users Manual" © 2000 Advantech Co., Ltd. (49 pages) http://advantech.vo.llnwd.net/o35/www/ess/downloads/M1_Advantech_Windows%20_CE_3_User%20_Manual.pdf?name=Advantech%20Windows%20CE%203.0%20User%20Manual.pdf&PHPSESSID=1f26907f69788d154c9eb92157d6018c.*

"Microsoft Windows CE: An Overview" © 2000 GeoComm International Corporation (3 pages) http://web.archive.org/web/20010207214925/http://www.wirelessdevnet.com/channels/pda/training/winceoverview.html.*

"E-115 Getting Started with the Cassiopeia Hardware Manual" © 2000 Casio Inc. (45 pages) http://www.casio.com/support/manuals/e115hw.pdf.*

"Pocket PC User's Guide" © 2000 Casio Computer Co., LTD. (67 pages) http://ftp.casio.co.jp/pub/world_manual/ce/en/e115/e115ug.pdf.*

"Microsoft Introduces DirectX for Windows CE" Published Feb. 29, 2000 (2 pages) http://www.microsoft.com/presspass/press/2000/feb00/dxpackpr.mspx.*

"Multimedia Streaming on Microsoft Windows CE 3.0" © 2000 Microsoft Corporation (Jun. 2000) (8 pages) http://msdn.microsoft.com/en-us/library/ms834433.aspx.*

Hacker, Scot. "MP3: The Definitive Guide" © 2000 O'Reilly Media Inc. Excerpt from Chapter 6, pp. 201 and 220-224 (7 pages total).*

"Help Topics: How to use the DropBox" © 2000 myplay Inc. (3 pages) Archive date of Dec. 1, 2000 from the Internet Archive. http://web.archive.org/web/200012012050/http://www.myplay.com/mp/help/help.jsp?pname=top_drop.*

"Help Topics: Getting music from your hard drive" © 2000 myplay Inc. (2 pages) Archive date of Oct. 20, 2000 from the Internet Archive. http://web.archive.org/web/20001020173916/http://www.myplay.com/mp/help/help.jsp?pname=top_gmhd.*

"Help Topics: Making mixes" © 2000 myplay Inc. (2 pages) Archive date of Dec. 2, 2000 from the Internet Archive. http://web.archive.org/web/200012020357/http://www.myplay.com/mp/help/help.jsp?pname=top_mkmix.*

Hacker, Scot. "MP3: The Definitive Guide" © 2000 O'Reilly Media Inc. Excerpt from Chapter 8 (pp. 271-277).*

"Beam-it™: Adding music from your CD collection to My.MP3.com is easy" Publication date of Mar. 1, 2000 as verified by the Internet Archive (2 pages) http://web.archive.org/web/20000301100556/http://www.mp3.com/my/beamit/index.html.*

"My.MP3.com—Help" Publication date of Nov. 9, 2000 as verified by the Internet Archive (2 pages) http://web.archive.org/web/20001109013 5/http://help.mp3.com/help/mymp3/tutorial/page2.html.*

"Musicbank and Sony Music Entertainment Ink Licensing Agreement". @Oct. 30 2000 Musicbank.com Archived at http:/Mebarchive.orgtweb/20001210002400/www.musicbank.com/pr6.html.

Borland, John. "Sprint POS unveils wireless MP3 ambitions" @Oct. 31, 2000 CNET Networks Inc. http://new.com. corn/2102-1033_3-247916html?tag=st.util. print.

Drury; Demand Jumps for High-Tech ID Producer; Business First; Oct. 22, 2001; vol. 18, No. 3, p. 1.

Harmon, Amy. "Deal Settles Suit Against MP3.com" @Nov. 15, 2000 New York Times Company. http:/www nytimes. corril2000/11/15/technology/i 5MUSI. html?ex=i 127275200&en843336327cff1333&ei=5070&printpage=yes.

Heltzel, Paul. "Access your CDs anywhere" @Oct. 18, 1999 CNN,com http://www.cnn.com/TECH/computing/9910/18/cds.anywhere.idg.

John Borland, The Latest in Anti-piracy Efforts: Keystroke Recognition, http://news.cnet.com/news/0-1005-202-2066437.html, pp. 1-2 (dated Jun. 13, 2000).

Kevin Featherly, Can Typing Style 'ID' Thwart Online Music Piracy?, http://www.ecommercetimes.com/news/articles2000/000613-nb1.shtml, pp. 1-5 (dated Jun. 13, 2000).

King, Brad. "MP3.com Lets Streams Flow". © 2000 Wired News/Lycos Inc. http:f/wired-vig.wired, com/newsfprint/0,1294,40536,00.html.

King, Brad. "Under the Influence: Majors control Licensing, therefore control music streaming services" © 2001 Variety.com http://www.variety.com/articleVR1 117792024?categoryid=16&cs=1&s=h&p=0.

McKendrick, Joseph, Creating a Password for Life from the Tip of a Finger, Nov. 3, 1999, ent, v4, n19, p. 22.

Middleware Mediated Transactions, Liebig and Tai, date unknown.

Music to be Protected by BioPassword, http://hitsquad.com/smm/news/275/, pp. 1-3 (dated Jun. 15, 2000)?????.

MyPlay.com: "Play your music" Published May 11, 2000 as verified by the Internet Archive. http://web.archive.org/web/20000511000039/www.myplay.com/corp/tour_play. html.

Myplay.com: "The Free myplay DropBox". Published Feb. 8, 2001 as verified by the Internet ArChive. http://web.archive.org/web/200102081> 00057www.myplay.com/mp/1ocker/client.jsp.

Net Nanny Licenses Biopassword® to Musicrypt.com, Provides Biometric Security for Digital Music Transactions, http://www.netnanny.com./press/press_20000612.htm, pp. 1-3 (dated Jun. 12, 2000).

Pack: "Traditional Retailers Plan Interactive Stores", Orlando Sentinel, May 25, 1995.

Stephanie Izarek, Let's See Some ID, http://www.foxnews.com/vtech/122199/biometrics.sml, pp. 1-4 (dated Dec. 21, 1999).

* cited by examiner

METHOD AND SYSTEM FOR RESTRICTED BIOMETRIC ACCESS TO CONTENT OF PACKAGED MEDIA

CROSS-REFERENCE TO RELATED APPLICATIONS

This application is a continuation of U.S. application Ser. No. 09/797,516, filed on Mar. 1, 2001, the disclosure of which is incorporated herein by reference.

BACKGROUND OF THE INVENTION

The present invention relates to a system and method for storing and distributing the content of packaged media. In particular, the present invention relates to a system and method for storing and distributing the content of packaged media over a network in a restricted manner.

Many consumers today have CD, DVD, MD or VHS packaged media. In order for consumers to access the content on their media, the consumers need to have the media immediately accessible to them. This requires that consumers wishing to enjoy their media from any place other than where the media is located must make a choice as to which media to take with them as they move about.

Alternatives to date have been for the consumer to upload the content of the media, in particular media in the CD audio format, for storage in an unsecured Internet accessible server. The consumer can then access the content through a network connection using portable devices. As a result, some copyright holders have had a problem with these alternatives since the alternatives offer the opportunity for people who do not own the media to easily access the content of the media from the server storage. For example, a consumer could purchase a CD and, using a personal computer (PC), upload the content stored on the CD into the storage of an unsecured server. This would then allow many other people who do not own the CD to use a network connection to access the content of the CD from the server storage.

There is thus a need for a system and method for allowing a user secure access to his or her personally owned packaged media from any location.

SUMMARY OF THE INVENTION

The present invention provides a system, method and a user device for restricting access to the content of media over a network. Biometric information of the user verifies the identity of the user, and allows a biometrically authenticated user to access the content of media that the user previously stored or identified on a server on a network.

To accomplish this, biometric information of the user is obtained with a biometric device associated with a user device. This biometric information is compared against pre-stored biometric information of the user to authenticate the identity of the user. The user requests access to the content of a medium stored on a server on the network. The user is provided access to the requested content if the content is identified as content, or indicia identifying the content, that the user device previously uploaded to the server. The user is denied access to the content if the content is not identified as content, or indicia identifying the content, that the user device previously uploaded to the server.

DETAILED DESCRIPTION

The present invention provides a system for restricting access to the content of packaged media over a network to biometrically authenticated users who previously uploaded the content of packaged media, or indicia identifying the content of packaged media, to a server on the network. In a preferred embodiment of the present invention, this restricted access is provided through a biometric registration, a subsequent biometric authentication, and identification of the content requested by the user as corresponding to the content, or indicia identifying the content, of packaged media that the user previously uploaded to the server.

Figure 1:
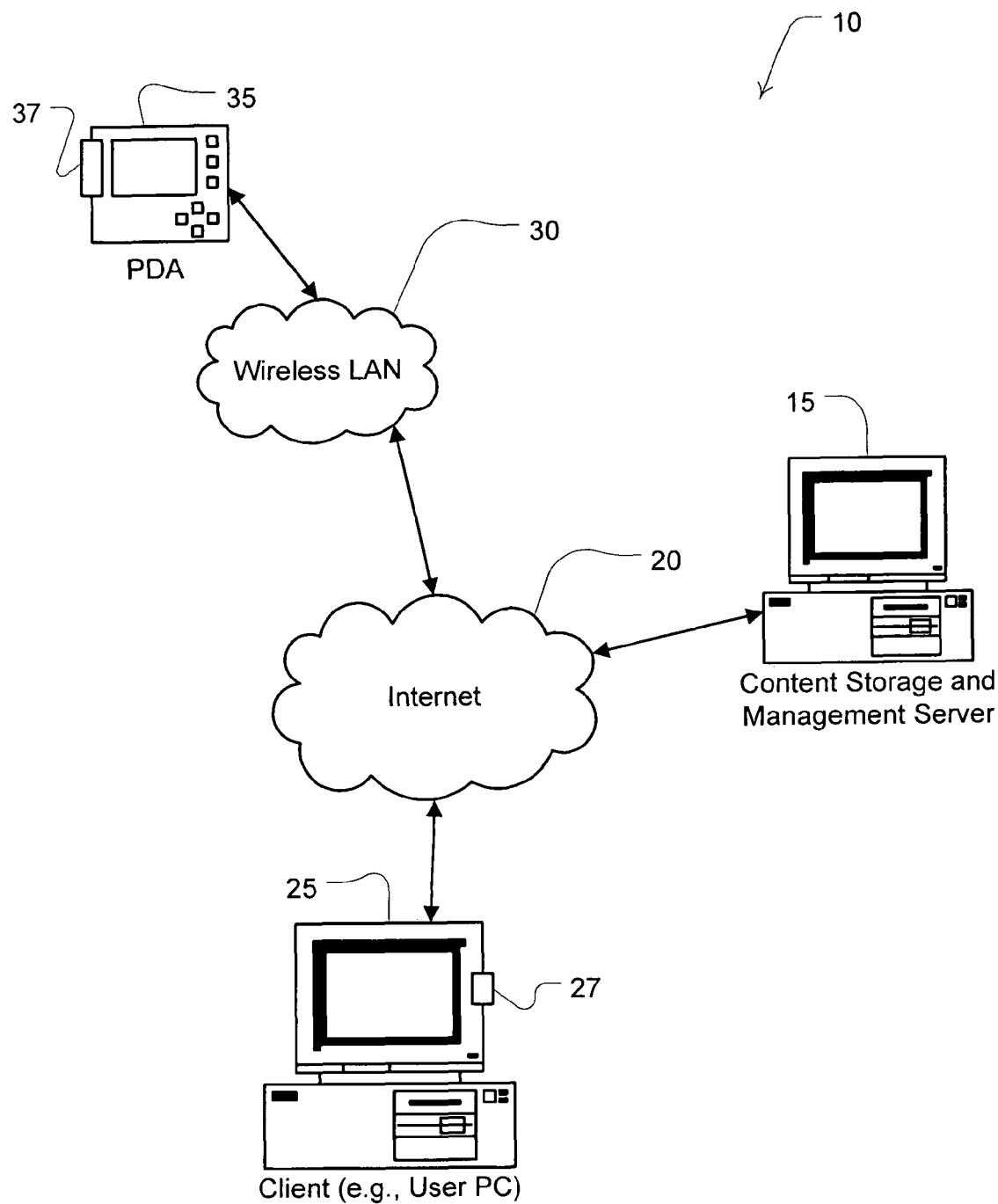
FIG. 1 illustrates one embodiment of a system in accordance with the present invention.

FIG. 1 is a diagram of a distributed computer network system 10 in accordance with the present invention. System 10 includes a network server, for example, content storage and management server 15, connected via network 20, for example, the Internet, to a client computer, for example, user PC 25. User PC 25 includes components normally found in a personal computer such as, for example, a memory, an operating system, a browser, and a content playing module. In accordance with the present invention, user PC 25 also has a content access managing module, referred to herein as a PC module. This module is discussed in greater detail below.

User PC 25 also preferably has a biometric device 27 for measuring a unique human characteristic of a user referred to herein as biometric information. Preferably, the biometric information will be a fingerprint or a voice pattern. Conventional fingerprint recognition and/or voice recognition technology may be used to collect and analyze the biometric information. Although these are the preferred types of biometric information, the present invention is not so limited, and other types of biometric information may include retina pattern, iris pattern, scent pattern, voice pattern, DNA pattern, heat pattern, facial image or any other human characteristic uniquely identifying a particular individual. Biometric device 27 may be built into user PC 25 or may be an external device connected to PC 25 through a cable or a wireless connection. Biometric device 27 may be a device that collects the biometric information of the user and then transmits the biometric information to a server 15, or another server on the network connected to server 15, for biometric authentication of the user. Alternatively, biometric device 27 may be a device that both collects the biometric information of a user, biometrically authenticates the user and then provides an authorization signal to server 15 or another server on the network connected to server 15.

Server 15 contains hardware and software for sending and receiving information over the network, such as web pages or files over the World Wide Web. Server 15 may be a typical web server or any other computer network server or automated system capable of communicating with other computers over a network, including the Internet, wide area networks or local area networks. In accordance with the present invention, server 15 includes components normally found in a network server, including, for example, a memory and an operating system. Server 15 also preferably includes a registration database, a content database, and a content access managing module, referred to herein as a network module. These databases and module are discussed in greater detail below.

Also connected to network 20 via wireless LAN 30 is a user personal digital assistant (PDA) 35. PDA 35 is a portable user device having wireless capability. PDA 35 includes components normally found in a PDA, including, for example, a memory, an operating system, a browser, and a content playing module. In accordance with the present invention, PDA 35 also preferably has a biometric device 37 for measuring biometric information of the user. Like user biometric device 27, biometric device 37 may be built in to PDA 35 biometric device or an external device connected to PDA 35 through a cable or wireless connection. Additionally, like user PC 25, biometric device 37 may be a device for collecting biometric information with biometric authentication occurring at server 15, or another server in communication with server 15, or may be a device that both collects the biometric information and biometrically authenticates the user.

In accordance with the present invention, PDA 35 also preferably includes a content access managing module, referred to herein as a PDA module. This module is discussed in greater detail below. Alternatively, a portable memory device, such as a CD, floppy disk, memory stick, etc. containing the PDA module may be inserted or plugged into PDA 35.

Although user PC 25 and PDA 35 are shown by way of example in FIG. 1 for interacting with server 15, it should be understood that in lieu of, or in addition to user PC 25 and PDA 35, other computer devices, such as set-top boxes, digital televisions, Internet appliances, portable computers, cellular telephones, MP3 players, etc., may be used for this purpose It also should be appreciated that although only two user devices are depicted in FIG. 1, server 15 is typically connected to many such user devices.

Figure 2:
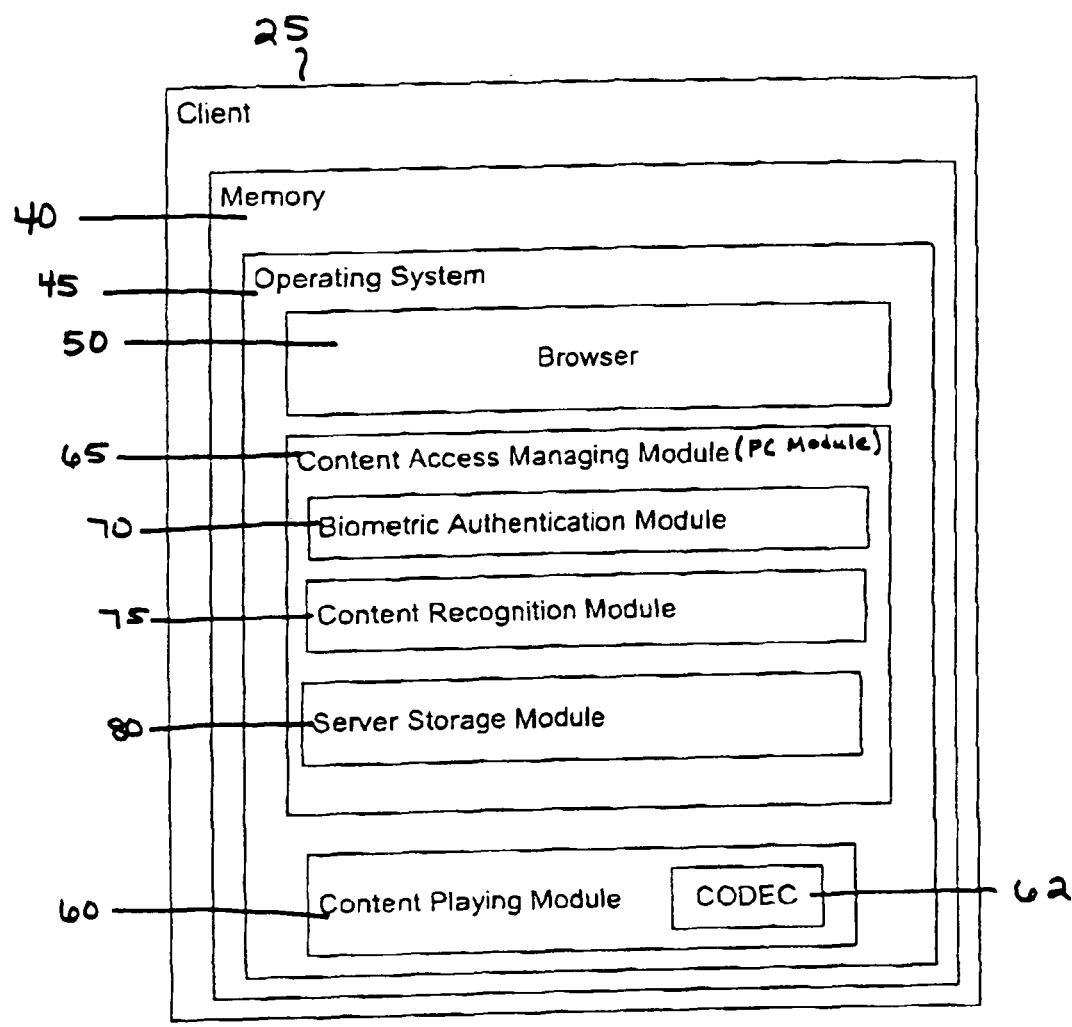
FIG. 2 illustrates a diagram of a personal computer configured in accordance with one embodiment of the present invention.

FIG. 2 provides a further description of the PC module. As discussed above, user PC 25 has components normally found in a personal computer, such as, for example, memory 40, operating system 45, browser 50 and content playing module 60. Content playing module 60 includes compression/decompression (CODEC) module 62. In accordance with the present invention, PC module 65 includes biometric authentication module 70, content recognition module 75, and server storage module 80.

If biometric device 27 only collects a user's biometric information, but does not biometrically authenticate the user, biometric authentication module 70, referred to hereinafter as biometric module 70, collects the user's biometric information. Biometric module 70 then transmits this biometric information to server 15, and server 15 biometrically authenticates the user. Alternatively, if biometric device 27 both collects the user's biometric information and biometrically authenticates the user, then biometric module 70 receives a biometric authentication signal from biometric device 27. Biometric module 70 then transmits this authentication signal to server 15.

Content recognition module 75, referred to hereinafter as recognition module 75, (i) recognizes the content of a CD (or other media) from a unique code or identifier read from the CD, (ii) transmits the unique code or identifier to server 15, (iii) receives responsive identification of the content from the server, and (iv) displays the responsive identification to the user. In the alternative, rather than recognition module 75 reading a unique code or identifier from the CD identifying the CD's content, the entire content of the CD can be uploaded to server 15 by server storage module 80.

For example, recognition module 75 can read a conventional digital fingerprint or identification code on a CD that uniquely identifies the content stored on the CD such as, for example, the bit pattern of the table of contents (TOC) portion of the CD. Recognition module 75 transmits the CD fingerprint or identification code to a database on server 15. If the content of the CD was previously stored on server 15, the CD's content does not require uploading to server 15.

Following identification of the CD, server storage module 80, referred to hereinafter as storage module 80, transmits the user's instruction to add the CD's content to an access rights portfolio of the user. The user's access rights portfolio may be located on user PC 25, a combination of user PC 25 and server 15, or preferably solely on server 15.

Alternatively, when the content of a CD is not already stored on server 15, storage module 80 uploads the content of the CD to server 15. The identity of such content similarly is included in the user's access rights portfolio.

Figure 3:
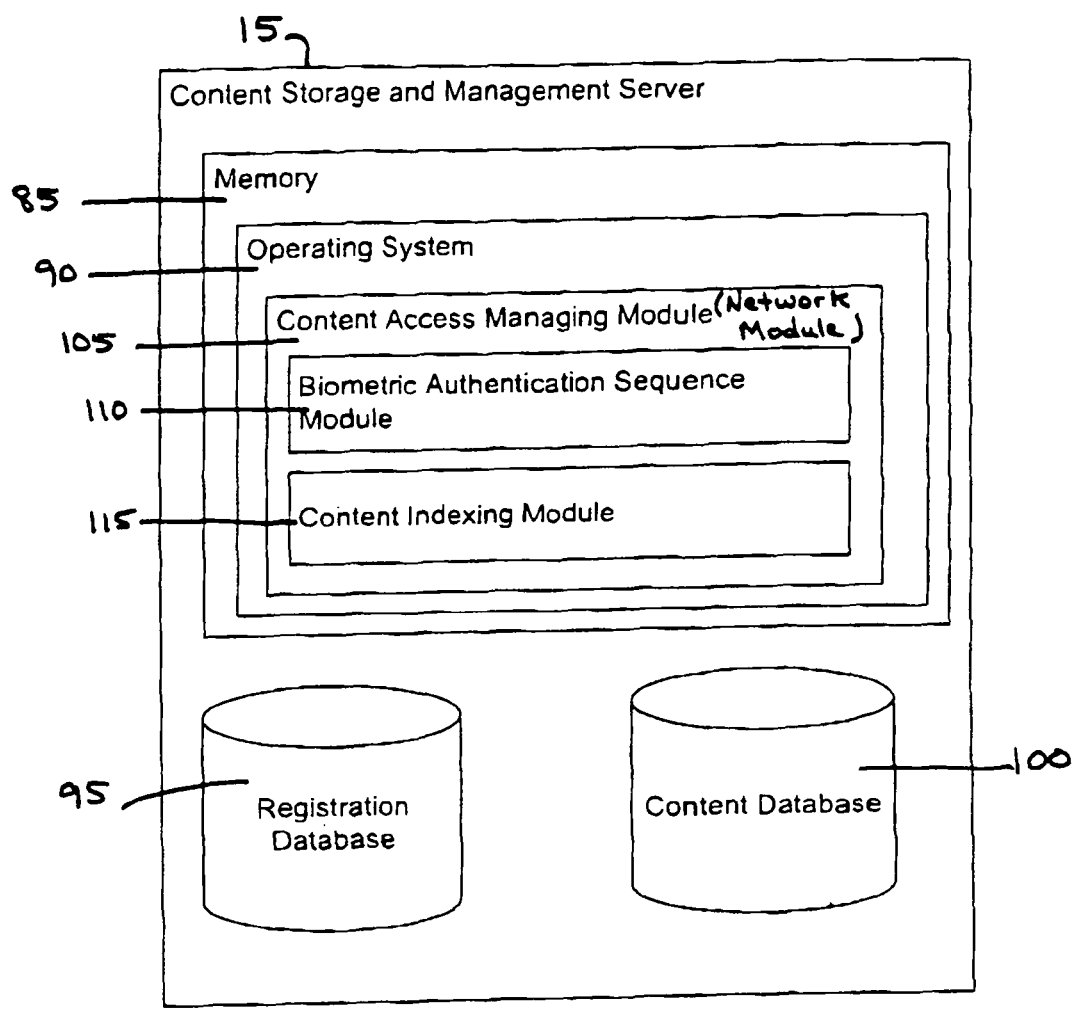
FIG. 3 illustrates a server configured in accordance with one embodiment of the present invention.

FIG. 3 provides a further description of the registration database, content database and network module of server 15. As discussed above, server 15 includes components normally found in a network server, including, for example, memory 85 and operating system 90. In accordance with the present invention, server 15 also includes registration database 95, content database 100, and network module 105. Registration database 95 stores biometric information of registered users. This information is compared against biometric information transmitted by users seeking access to media content to authenticate these users. Content database 100 stores the actual content of packaged media to be accessed by authenticated users.

Network module 105 includes biometric authentication sequence module 110, referred to hereinafter as biometric module 110, and content indexing module 115, referred to hereinafter as indexing module 115. Biometric module 110 includes software for registering users, initiating access rights to identified content, and granting access to previously identified content. Indexing module 115 indexes the content of media stored in content database 100. For example, indexing module 115 indexes the song titles and track numbers of a CD, or the picture names and chapter numbers of a DVD. Indexing module 115 also stores, for each registered user, pointers to the content stored in content database 100 for which the user is permitted access. This scheme avoids redundant storage of content to which many users have access rights.

Figure 4:
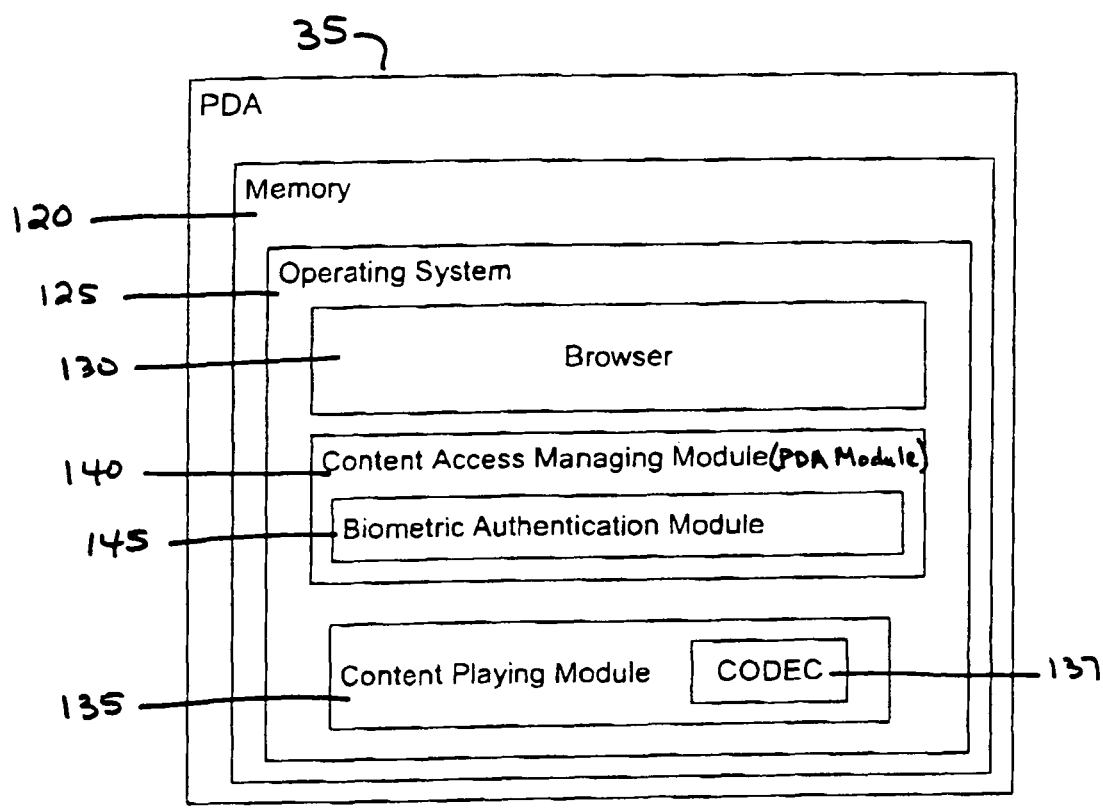
FIG. 4 illustrates a portable user device configured in accordance with one embodiment of the present invention.

FIG. 4 further illustrates PDA 35. As discussed above, PDA 35 includes components normally found in a PDA, including, for example, memory 120, operating system 125, browser 130 and content playing module 135. Content playing module 135 includes compression/decompression (CODEC) module 137. In accordance with the present invention, PDA 35 also includes content access managing module 140, referred to hereinafter as PDA module 140. PDA module 140 may be included in memory 120. Alternatively, PDA 35 may include means for receiving a portable memory device, such as, a CD, a floppy disk, a removable FLASH memory (preferably a Sony Memory Stick) etc., containing PDA module 140.

PDA module 140 includes biometric authentication module 145, referred to hereinafter as biometric module 145. If biometric device 37 only collects a user's biometric information, but does not biometrically authenticate the user, biometric module 145 collects the user's biometric information. Biometric module 145 then transmits this biometric information to server 15, and server 15 biometrically authenticates the user. Alternatively, if biometric device 37 both collects the user's biometric information and biometrically authenticates the user, biometric device 37 transmits a biometric authentication signal to biometric module 145. Biometric module 145 then transmits this authentication signal to server 15.

Alternatively, if a portable memory device, such as, a removable FLASH memory contains PDA module 140 inserting the removable FLASH memory into a portable device, such as, PDA 35 migrates to PDA 35 the biometric authentication functionality of PDA module 140, including biometric authentication module 145. In accordance with the present invention, PDA 35 then also has biometric device 37 for measuring biometric information of the user. Biometric device 37 may be built into PDA 35 or may be an external device connected to PDA 35 through a cable or wireless connection. Additionally, biometric device 37 may be a device for collecting biometric information with biometric authentication occurring at server 15, or another server in communication with server 15, or may be a device that both collects the biometric information and biometrically authenticates the user.

Referring now to FIGS. 1 and 2, in a preferred embodiment, user PC 25 communicates with server 15 via network connection 20. The user originally accesses server 15 through notification of the URL. The user then registers for a service to authenticate the identity of the user to permit secured access to the content of a packaged medium owned by the user, for example, the content of a CD in audio format. This registration involves providing, e.g., the user's name, address, phone number, email address, biometric information, etc.

As part of this registration, the user activates biometric device 27 to measure biometric information of the user. Biometric module 70 of user PC 25 collects the biometric information of the user from the biometric device 27. User PC 25 transmits the biometric information from biometric module 70 to registration database 95 of server 15. Registration database 95 stores the biometric information of the user. Upon storage of the user's biometric information in registration database 95, the registration is complete.

Alternatively, as described in connection with FIG. 2, if biometric device 27 is a device that both collects the biometric information and authenticates the user's identity, the user activates biometric device 27 to measure the biometric information of the user. Biometric device 27 stores this biometric information in biometric device 27, and also transmits a signal to biometric module 70 of user PC 25 indicating that this biometric information was collected and stored. Biometric module 70 then transmits this signal to server 15, and the registration is complete.

After registration, the user can access server 15 using, e.g., conventional browser 50 of PC 25 or browser 130 of PDA 35. The initial access is accomplished in a conventional manner. However, after initial access is affected, server 15 activates biometric module 110 for the purpose of recognizing and authenticating the identity of the user. For example, if the user is using PC 25 to access server 15, the user will be prompted to provide the biometric information of the user to biometric device 27 of PC 25. In that case, biometric module 70 collects the biometric information, and transmits the biometric information to biometric module 110 of server 15. Biometric module 110 compares the biometric information received from biometric module 70 against the previously stored copy of the biometric information of the user stored in registration database 95 for the purpose of authenticating the identity of the user. If the biometric information received from biometric module 70 matches the biometric information stored in registration database 95 for the user, a verification code is generated and access is granted to the user to appropriate content. If the biometric information received from biometric module 70 does not match the biometric information stored in registration database 95, a denial code is generated and access is denied to the user for any content.

Alternatively, if biometric device 27 is used to biometrically authenticate the user (not simply collect the biometric information for authentication by server 15), after registration, the user accesses server 15 using browser 50. The user activates biometric device 27 to collect the user's biometric information. Biometric device 27 compares the biometric information against the previously stored copy of the biometric information stored in biometric device 27 (or PC 25) for the purpose of authenticating the identity of the user. If the biometric information matches the previously stored biometric information, an authentication signal is generated. If the biometric information does not match the previously stored biometric information, a denial code is generated. If biometric device 27 generates an authentication signal, biometric device 27 transmits the authentication signal to biometric module 110 of server 15.

After a user accesses server 15 and his or her identity is authenticated, e.g., as part of the registration process or during any access to server 15 following registration, the user may wish to add media content to his or her access rights portfolio. To do so, the user inserts media, e.g., a CD into, e.g., the disc drive of user PC 25. Recognition module 75 of user PC 25 reads a conventional digital fingerprint or identification code of the CD that uniquely identifies the content stored on the CD. For example, recognition module 75 may read the bit pattern of the TOC portion of the CD to uniquely identify the content stored on the CD. Recognition module 75 transmits the CD fingerprint or identification code to registration database 95 of server 15. Registration database 95 communicates with indexing module 115 to identify the content requested by the user. Indexing module 115 maps the CD fingerprint or identification code to the identity of the content of the CD. If indexing module 115 identifies the content of the CD as content already stored in content database 100, recognition module 75 receives responsive identification of the content from server 15, and displays the responsive identification of the content to the user. Alternatively, if indexing module 115 does not identify the content of the CD as content already stored on server 15, the disc drive of user PC 25 reads the content of the CD, and storage module 80 uploads the content of the CD to content database 100 of server 15.

After PC 25 uploads to server 15 either the unique fingerprint or code from the CD, or the content of the CD, content indexing module 115 manages and provides an index of this content as content that the user may access in a user's access rights portfolio. Alternatively, this index may be maintained by PC module 65 or on a combination of both server 15 and PC module 65. Preferably, the portfolio is included on server 15 for security and to accommodate the user's access to the content from different user devices. Once the content is identified in the user's access rights portfolio on server 15, the user can subsequently access the content from any location and from any device having a biometric device similar to biometric device 27 or biometric device 37.

For example, after the user registers and establishes the user's access rights portfolio on server 15, the user can access the content identified in the access rights portfolio from any location using PDA 35. Turning to FIGS. 1 and 4, PDA 35 is connected to server 15 via wireless network connection 30 and network 20. The user accesses server 15 using browser 130 of PDA 35. To authenticate the user's identity, the user activates biometric device 37 to measure biometric information of the user. Biometric module 145 collects the biometric information of the user, and transmits the biometric information to biometric module 110 of server 15. Biometric module 110 compares the biometric information received from biometric module 145 against the previously stored copy of the biometric information of the user stored in registration database 95. If the biometric information received from biometric module 145 matches the biometric information stored in registration database 95 for the user, a verification code is generated and access is granted to the user to the content identified in the user's access rights portfolio. If the biometric information received from biometric module 145 does not match the biometric information stored in registration database 95, a denial code is generated and access is denied to the user to any content.

Alternatively, if biometric device 37 is used to both collect the biometric information and biometrically authenticate the user, after registration, the user accesses server 15 using browser 130. The user activates biometric device 37 to collect the user's biometric information. Biometric device 37 then compares this biometric information against the previously stored copy of the biometric information in biometric device 37 or PDA 35 for the purpose of authenticating the identity of the user. If the biometric information matches the previously stored biometric information, an authentication signal is generated. If the biometric information does not match the previously stored biometric information, a denial code is generated. If biometric device 37 generates an authentication signal, biometric device 37 transmits the authentication signal to biometric module 110 of server 15.

After the identity of the user is biometrically authenticated, the user can access from PDA 35 the user's access rights portfolio on server 15. From the user's access rights portfolio, the user can choose the content that the user desires to have played back on PDA 35. Indexing module 115 is used to easily display to the user a list of the content for which the user has access rights. Indexing module 115 assists the user in searching for available content, e.g., song titles or a playlist. The user may have previously compiled a playlist with user PC 25, e.g., and uploaded the playlist to server 15 allowing access to the playlist through a network connection using a portable device, e.g., PDA 35. The user chooses the content that the user desires to have played back on PDA 35 using content playing module 135. Typically, the content stored on server 15 is stored in MP3 or ATRAC format. Content database 100 of server 15 transmits the requested content to PDA 35. The playback can be accomplished using conventional streaming audio or, alternatively, downloading the content to the user device, e.g., PDA 35. Preferably, the playback is accomplished using conventional streaming audio.

Although the invention herein has been described with reference to particular embodiments, it is to be understood that these embodiments are merely illustrative of the principles and applications of the present invention. It is, therefore, to be understood that numerous modifications may be made to the illustrative embodiments and that other arrangements may be devised without departing from the spirit and scope of the present invention as defined by the appended claims.

The invention claimed is:

1. A portable music player to restrict access to digital content on a communications network, comprising:
    a portable music player to play for a user of the portable music player digital content received over the network; and
    a biometric measuring component, coupled with the portable music player, the biometric measuring component to measure biometric information of the user;
    wherein the portable music player is configured to generate an authentication signal at the portable music player if a coincidence exists between reference fingerprint data of a fingerprint stored at the portable music player and measured fingerprint data of a fingerprint measured by the biometric component of the portable music player,
    wherein the portable music player is configured to transmit the authentication signal across a network to a server to authenticate the user of the portable music player with the server so that the successful transmission of the authentication signal to the server permits the portable music player to access (a) a previously uploaded playlist associated with the user, the playlist identifying playable digital content accessible to more than one user, and (b) protected playable digital content,
    wherein the playlist is a data structure containing links to a plurality of digital content files.

2. The portable music player of claim 1 wherein the digital content comprises digital audio data.

3. The portable music player of claim 1 wherein the portable music player is configured to receive the protected playable digital content as a data stream upon the successful transmission of the authentication signal.

4. The portable music player of claim 1 wherein the portable music player is configured to receive the protected playable digital content as a data download upon the successful transmission of the authentication signal.

5. The portable music player of claim 1 wherein the portable music player is further configured to transmit through the network the playable digital content that is accessed upon successful receipt of an authentication signal at the server.

6. A method for restricting access to playable digital content on a network, comprising the steps of:
    uploading a playlist created by a user to a server, wherein the playlist is a data structure containing links to a plurality of digital content files,
    measuring biometric information of the user with a biometric component integrated with a portable music player;
    generating an authentication signal at the portable music player if a coincidence exists between reference fingerprint data of a fingerprint stored at the portable music player and measured fingerprint data of a fingerprint measured by the biometric component of the portable music player,
    with the portable music player, transmitting the authentication signal across the network to the server to authenticate the user of the portable music player with the server so that the successful transmission of the authentication signal to the server permits the portable music player to access (a) the previously uploaded playlist associated with the user, the playlist identifying playable digital content accessible to more than one user, and (b) protected playable digital content; and
    playing the protected playable digital content received over the network on the portable music player.

7. The method of claim 6 wherein the protected playable digital content comprises digital audio data.

8. The method of claim 6 wherein the portable music player receives the protected playable digital content as a data stream upon the successful transmission of the authentication signal.

9. The method of claim 6 wherein the portable music player receives the protected playable digital content as a data download upon the successful transmission of the authentication signal.

10. A portable music player to restrict access to digital content on a communications network, comprising:

a portable music player to play for a user of the portable music player digital content received over the network; and a biometric measuring component, integrated with the portable music player, the biometric measuring component to measure biometric information of the user, wherein the portable music player is configured to generate an authentication signal at the portable music player if a coincidence exists between reference fingerprint data of a fingerprint stored at the portable music player and measured fingerprint data of a fingerprint measured by the biometric component of the digital content playing device, wherein the portable music player is configured to transmit the authentication signal across a network to a server to authenticate the user of the portable music player with the server so that the successful transmission of the authentication signal to the server permits the portable music player to access (a) a previously uploaded playlist associated with the user, the playlist identifying playable digital content accessible to more than one user, and (b) protected playable digital content, wherein the playlist is a data structure containing links to a plurality of digital content files, and wherein the portable music player is further configured to transmit through the network the playable digital content that is accessed upon successful receipt of an authentication signal at the server.

11. The portable music player of claim 10 wherein the digital content comprises digital audio data.

12. The portable music player of claim 10 wherein the portable music player is configured to receive the protected playable digital content as a data stream upon the successful transmission of the authentication signal.

13. The portable music player of claim 10 wherein the portable music player is configured to receive the protected playable digital content as a data download upon the successful transmission of the authentication signal.

14. A method for restricting access to playable digital content on a network, comprising:

uploading a playlist created by a user to a server, wherein the playlist is a data structure containing links to a plurality of digital content files, measuring biometric information of the user with a biometric component of a portable music player;

generating an authentication signal at the portable music player if a coincidence exists between reference fingerprint data of a fingerprint stored at the portable music player and measured fingerprint data of a fingerprint measured by the biometric component of the portable music player, with the portable music player, transmitting the authentication signal across the network to the server to authenticate the user of the portable music player with the server so that the successful transmission of the authentication signal to the server permits the portable music player to access (a) the previously uploaded playlist associated with the user, the playlist identifying playable digital content accessible to more than one user, and (b) protected playable digital content;

from portable music player, transmitting through the network the playable digital content that is accessed upon successful receipt of an authentication signal at the server; and playing the protected playable digital content received over the network on the portable music player.

15. The method of claim 14 wherein the protected playable digital content comprises digital audio data.

16. The method of claim 14 wherein the portable music player receives the protected playable digital content as a data stream upon the successful transmission of the authentication signal.

17. The method of claim 14 wherein the portable music player receives the protected playable digital content as a data download upon the successful transmission of the authentication signal.

* * * * *